United States Patent [19]

Unger

[11] Patent Number: 4,691,991
[45] Date of Patent: Sep. 8, 1987

[54] SINGLE MODE MODIFIED W-FIBER

[75] Inventor: Hans-Georg Unger, Brunswick, Fed. Rep. of Germany

[73] Assignee: ANT Nachrichtentechnik GmbH, Backnang, Fed. Rep. of Germany

[21] Appl. No.: 624,701

[22] Filed: Jun. 26, 1984

[30] Foreign Application Priority Data

Jun. 29, 1983 [EP] European Pat. Off. ........ 83106312.8

[51] Int. Cl.$^4$ ................................. G02B 6/22
[52] U.S. Cl. ........................ 350/96.33; 350/96.30
[58] Field of Search ................. 350/96.29, 96.30, 96.33

[56] References Cited

U.S. PATENT DOCUMENTS

| 4,000,416 | 12/1976 | Goell | 350/96.30 |
| 4,165,152 | 8/1979 | Shiraishi et al. | 350/96.30 |
| 4,439,007 | 3/1984 | Lazay et al. | 350/96.30 |
| 4,447,125 | 5/1984 | Lazay et al. | 350/96.30 |

OTHER PUBLICATIONS

S. Kobayashi et al., "Refractive-Index Dispersion of Doped Fused Silica, "*Proc. IOOC* '77 (1977), pp. 309-312.
V. A. Bhagavatula et al., "Segmented-Core Single-Mode Fibres with Low Loss and Low Dispersion," *Electronics Letters*, vol. 19, No. 9 (1983), pp. 317-318.
Cohen et al, Low-Loss Quadruple-Clad Single-Mode Lightguides . . . , Electronics Letters, Nov. 25, 1982, vol. 18, No. 24, pp. 1023-1024.
K. Jürgensen, "Dipsersion Miniumu of Monomode Fibers", Applied Optics, Apr. 15, 1979, vol. 18, No. 8, pp. 1259-1261.
L. Jeunhomme, "Dispersion Minimisation in Single-Mode Fibres Between 1-3 $\mu$m and 1-7 $\mu$m", Electronics Letters, Jul. 19, 1979, vol. 15, No. 15, pp. 478-479.
H. Tsuchiya et al, "Dispersion-Free Single Mode Fibre in 1-5 $\mu$m Wavelength Region", Electronics Letters, Jul. 19th, 1979, vol. 15, No. 15, pp. 476-478.
L. G. Cohen et al, "Tailoring Zero Chromatic Dispersion into the Electronics Letters, Jun. 7th, 1979, vol. 15, No. 12, pp. 334-335.
B. J. Ainslie et al, "Monomode Fibre with Ultra-Low Loss and Minimum Dispersion at 1.55 $\mu$m", Electronics Letters, Sep. 16, 1982, vol. 18, No. 19, pp. 842-844.
K. Okamoto et al, "Dispersion Minimisation in Single-Mode Fibres Over a Wide Spectral Range", Electronics Letters, Oct. 25, 1979, vol. 15, No. 22, pp. 729-731,
T. Miya et al, "Fabrication of Low Dispersion Single-Mode Fibers Over a Wide Spectral Range", IEEE Journal of Quantum Electronics, Jun. 1981, vol. QE-17, No. 6, 858-861.
L. Cohen et al, "Tailoring the Shapes of Dispersion Spectra . . . " Optics Letters, Apr. 1982, vol. 7, No. 4, pp. 183-185.

*Primary Examiner*—William L. Sikes
*Assistant Examiner*—Frank González
*Attorney, Agent, or Firm*—Spencer & Frank

[57] ABSTRACT

A modified single-mode W-fiber with a special threshold cladding layer surrounding the inner cladding layer in order to yield a dispersion coefficient having zeros at three different wavelengths, and as a consequence typically less than 1 ps/(nm km) dispersion over a wavelength range of nearly 0.4 $\mu$m.

7 Claims, 6 Drawing Figures

SINGLE MODE MODIFIED W-FIBER

BACKGROUND OF THE INVENTION

The present invention is directed to an optical fiber having a multiple-clad core, and in particular to an improved W-fiber having a threshold cladding layer in order to provide low dispersion at a wide range of wavelengths.

Optical signals in single-mode fibers suffer distortion due to the fact that the fundamental mode delay $t_g$ changes with wavelength $\lambda$. For a step-index fiber having a core surrounded by a single layer of cladding material, FIG. 1A shows how the effective group-index of the fundamental mode $N' = ct_g/L$ depends qualitatively on wavelength. (See L. G. Cohen and W. L. Mammel: Low-loss quadruple-clad single-mode-light guides with dispersion below 2 ps/km nm over the 1.28 $\mu$m -1.65 $\mu$m wavelength range, Electron. Lett. 18 (1982) 1023-1024). Here c is the vacuum velocity of light and L is the length of the fiber. The dotted curves designated by $n_{co}'$ and $n_{cl}'$ represent the group-indices of the core and the cladding material, respectively. The group-index $n'$ of a material is related to the index of refraction n of the material by the relationship:

$$n' = n - \lambda \frac{dn}{d\lambda} \qquad (1)$$

At short wavelengths (corresponding to the values of the fiber parameter $V = (2\pi a/\lambda)\sqrt{n_{co}^2 - n_{cl}^2}$ larger than 3, with a as the core radius), the fundamental mode fields are well concentrated within the core so that this mode propagates at a rate that depends substantially upon the group-index of the core material. With increasing wavelength the fields extend ever wider into the cladding so that eventually the fundamental mode propagates at a rate depending substantially upon the group-index of the cladding. This is shown in FIG. 1A, which illustrates that the effective group-index $N'$ of a fiber having a core surrounded by a layer of cladding material is close to the group-index $n_{co}'$ of the core at short wavelengths and approaches the group-index $n_{cl}'$ at long wavelengths.

The group-index of fused silica has a minimum near $\lambda = 1.28$ $\mu$m. Doping fused silica with germanium or phosphor to raise its refractive index in the fiber core or with fluorine to lower its refractive index in the cladding shifts this minimum only slightly. The effective group-index of a fiber having a core surrounded by a layer of cladding material will also pass through a minimum, as illustrated by the dip in $N'$ in FIG. 1A, as the fundamental mode makes its transition from the core group-index to the cladding group-index with increasing wavelength. To the first order, at such a minimum in the effective group-index of a fiber the fundamental mode delay becomes independent of wavelength and the dispersion D of the fiber becomes minimal. At such a minimum the slope of the delay characteristic vanishes and only its curvature (that is, higher derivative components) remains to distort signals, yet by orders of magnitude less. However, for such a dispersion minimum to be of any use for signal transmission it must be at a long enough wavelength so that the core guides only the fundamental mode, yet not too long a wavelength, lest the fundamental mode fields extend too far out into the cladding and become too sensitive to fiber bending. The dispersion must for these two reasons occur in the wavelength range where the effective group-index of the fundamental mode transits from the group-index of the core to that of the cladding. Simple step-index fibers as well as gradient-index fibers without any index depression below the cladding index can be designed to have one dispersion minimum in the useful single-mode range, but only at wavelengths somewhat longer than that of the material dispersion minimum at $\lambda \approx 1.28$ $\mu$m (see K. Jürgensen: Dispersion minimum of monomode fibers, Appl. Opt. 18 (1979) 1259-1261; L. Jeunhomme: dispersion minimization in single-mode fibers between 1.3 $\mu$m and 1.7 m, Electron. Lett. 15 (1979) 478-479; H. Tsuchiya and N. Imoto: Dispersion-free single-mode fiber in 1.5 $\mu$m wavelength region, Electron. Lett. 15 (1979) 476-478; L. G. Cohen et al: Tailoring zero chromatic dispersion into the 1.5-1.6 $\mu$m low loss spectral region of single-mode fibers, Electron. Lett. 15 (1979) 334-335; and B. J. Ainslie et al: Monomode fiber with ultra-low loss and minimum dispersion at 1.55 $\mu$m, Electron. Lett. 18 (1982) 842-844).

It is known that an additional layer of cladding material can be added, and that the resulting fiber exhibits a modified effective group-index. This can result in a fiber having a W-index profile with an annular cross-sectional region of depressed index surrounding the core (that is, along a line through the center of the fiber the index of refraction dips between the outer cladding and the core and dips again between the core and the outer cladding, so that the index of refraction varies in the manner of a stylized W along the diameter of the fiber), the effective group-index of the fundamental mode in making its transition with increasing wavelength from the group-index of the core to that of the cladding will be affected by the lower index $n_w$ of the intermediate layer and tend to approach its group-index $n_w'$. In a suitably designed W-fiber (see K. Okamoto et al: Dispersion minimization in single-mode fibers over a wide spectral range, Electron. Lett. 15 (1980) 729-731; T. Miya et al: Fabrication of low dispersion single-mode fibers over a wide spectral range, IEEE J. QE 17 (1981) 858-861; and L. G. cohen et al: Tailoring the shapes of dispersion spectra to control band widths in single-mode fibers, Opt. Lett. 7 (1982) 183-185) the effective group-index of the fundamental mode will, with increasing wavelength, first pass a minimum and, after increasing somewhat, pass a maximum and turn down again, as it is o shown in FIG. 1A by the line designated with $N_w'$. When $N_w'$ approaches $n_{cl}'$, or even crosses it, the fundamental mode fields will extend far out into the cladding and become very sensitive to fiber bending, or the fundamental mode will even be cut off. Such a W-fiber cannot be operated at wavelengths much beyond the maximum of $N_w'$.

The fundamental mode of the optical fiber is that particular guided mode of propagation which, with increasing values of the fiber parameter $V = (2\pi a/\lambda)\sqrt{n_{co}^2 - n_{cl}^2}$, is the first one to be guided by the fiber core, and, for a certain range of values of the fiber parameter V up to the cutoff value of the next higher order modes, also the only mode which the fiber core guides. a is the radius of the fiber core. The group index $n'$ of a material is defined by relations (1). The effective group index $N'$ of a mode of propagation of an optical waveguide is defined by the relationship $$N' = N - \lambda \frac{dN}{d\lambda} \qquad (1a)$$

where N is the effective index of this mode of propagation and related to its phase coefficient $\beta$ and the wavenumber $k=2\pi/\lambda$ by the relationship $$N=\beta/k$$

SUMMARY OF THE INVENTION

The object of the present invention is to provide an improved W-fiber having little dispersion over a wide spectral range.

This object can be attained by providing a W-fiber having a threshold layer of cladding surrounding the inner cladding, the threshold layer having a raised index of refraction. Preferably the ratio of the outer diameter of the threshold layer to the inner diameter of the threshold layer as well as the ratio of the inner diameter of the threshold layer to the core diameter range from about 1.4 to 1.8, and the index of refraction of the threshold layer ranges from about 0.05% to 0.15% greater than the index of refraction of an outer cladding layer surrounding the threshold layer, while the index of refraction of the inner cladding layer ranges from 0.2% to 0.8% lower than the index of refraction of the outer cladding layer and the index of refraction of the core from 0.15% to 0.8% greater than the index of refraction of the outer cladding layer.

DESCRIPTION OF THE PREFERRED EMBODIMENT

In the present invention the dispersion characteristic of the fundamental mode of a conventional W-fiber, having a core surrounded by an inner cladding layer having a depressed index of refraction $n_w$ which is in turn surrounded by an outer cladding layer having an index of refraction $n_{cl} > n_w$, is improved by interposing an additional "threshold" layer of cladding material having an index of refraction $n_t > n_{cl}$ between the inner and outer cladding layers.

Figure 2:
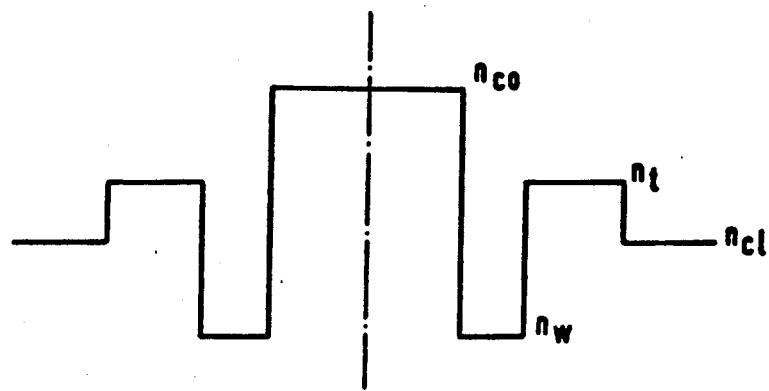
FIG. 2 illustrates the index-profile of the WT-fiber of the present invention.
Figure 5:
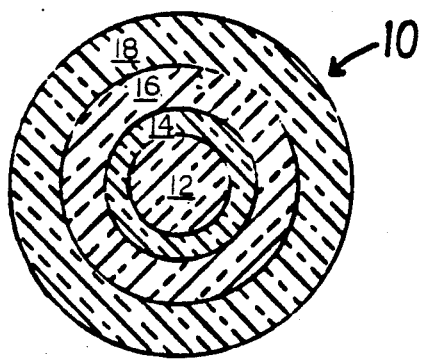
FIG. 5 is a cross-sectional view of a WT-fiber according to the present invention.

In FIG. 5 WT—fiber 10 —a W—fiber modified by the addition of a threshold layer of cladding — includes a core 12 which is surrounded successively by an inner cladding layer 14, a threshold cladding layer 16, and an outer cladding layer 18. FIG. 2 illustrates the relative values of the indices of refraction $n_{co}$, $n_w$, $n_t$ and $n_{cl}$ of core 12, inner cladding layer 14, threshold cladding layer 16 and outer cladding layer 18, respectively.

Figure 1:
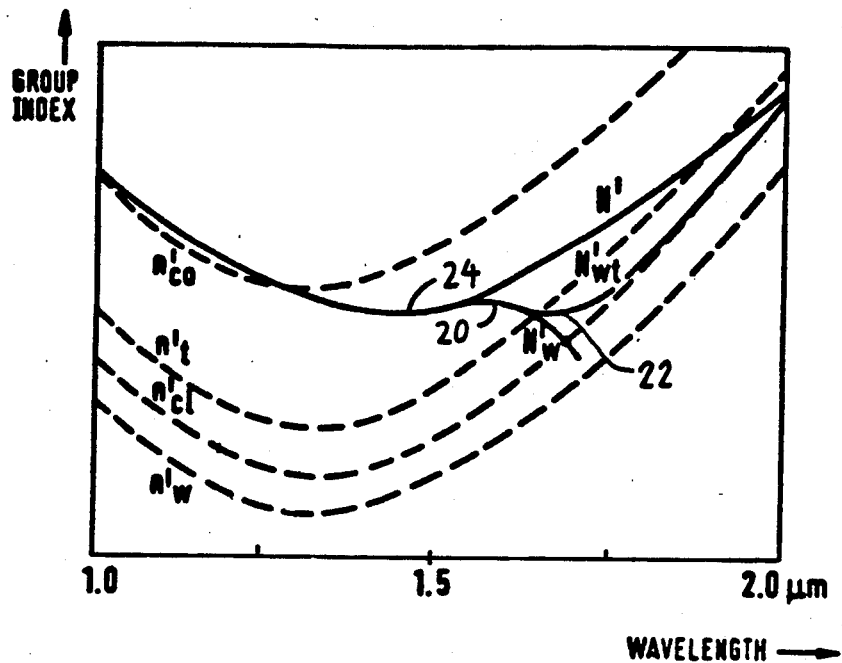
FIG. 1A is a graph of the group-index of the core ($n_{co}'$) and outer cladding ($n_{cl}'$) of a step-index fiber, the group-index of the additional inner cladding ($n_w'$) of a W-fiber, and the group-index of the additional threshold cladding ($n_t'$) of the WT-fiber (a W-fiber with threshold cladding) of the present invention, along with the effective group-indices $N'$, $N'_w$ and $N_{wt}'$ of the step-index fiber, W-fiber and WT-fiber of the present invention, respectively.
FIG. 1B is a graph illustrating the dispersion coefficient of the fundamental mode of the WT-fiber of the present invention.
Figure 1:
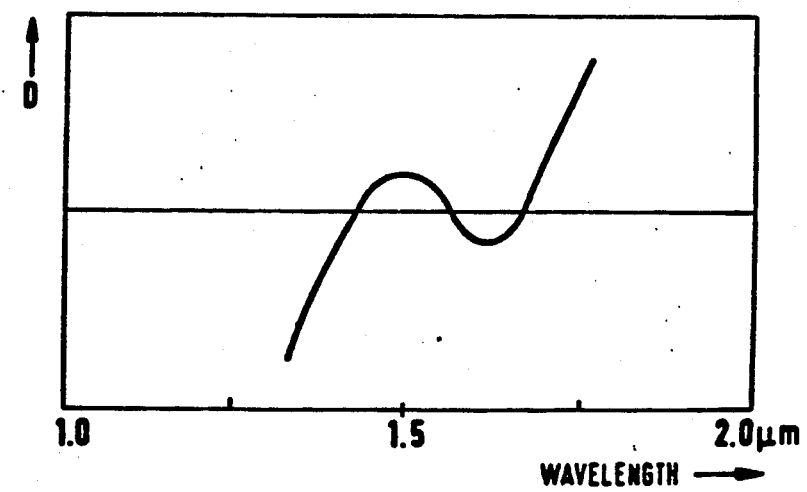

Threshold cladding layer 16 serves to confine the fundamental mode fields before they extend too far out into the cladding, and it also shifts the fundamental mode cutoff to longer wavelengths or eliminates it altogether. In doing this, threshold cladding layer 16 prevents the effective group-index $N_{wt}'$ of the fundamental mode from turning down too much beyond its maximum, and even makes it turn up again and gradually approach the effective group-index $n_{cl}'$ of the outer cladding as illustrated in FIG. 1A. While the depressed index $n_w$ of the inner cladding layer 14 causes the relative maximum of the effective group-index, identified by reference number 20 in FIG. 1A, threshold cladding layer 16 causes the second relative minumum, identified by reference number 22. In between the two relative minima 22 and 24 and somewhat beyond the fundamental mode will have a wide spectral range of low dispersion.

Responsibility for pulse broadening is to the first order dependent upon the derivative of the group delay with respect to optical frequency or wavelength $$D = \frac{1}{c} \frac{dN'}{d\lambda} \qquad (2)$$

FIG. 1B shows this dispersion coefficient D of the fundamental mode in a suitably designed WT-fiber. It crosses zero where the effective group-index $N_{wt}'$ has an extremum and should preferably have the same absolute value at its minimum as at its maximum. Furthermore, the limit of the single-mode range, where the next higher order mode is cut off, should be sufficiently below the short wavelength limit of the low-dispersion range, while at the long wavelength limit of this spectral range the fundamental mode fields should be sufficiently well confined for the fiber to remain insensitive to bending. Also the low-dispersion range should extend as far as possible over that part of the low-loss range of fused silica fibers over which efficient InGaAsP-lasers and detectors operate.

For a WT-fiber to have a dispersion coefficient D with these properties, effective index $N_{wt} = \beta_{wt}/k$ of the fiber's fundamental mode as well as the first and second derivatives with respect to wavelength must be determined very accurately. The residual dispersion can be so small over an extended spectral range that only a very accurate solution of the boundary value problem will give reliable results.

In view of the necessity for accuracy, it is advantageous to employ the so-called vector-wave solution, for which in each homogeneous layer of the multilayered structure the general solution of Maxwell's equations of a particular circumferential order is set up in terms of fundamental systems of cylinder functions. From this, those components of the electromagnetic field are derived which are tangential to the boundaries between layers. These fields are then matched at boundaries between adjacent layers. This procedure yields the exact characteristic equation for the fiber model of FIG. 2, with uniform layers. When solving the mathematics numerically to obtain the effective group-index of the fundamental mode as a function of wavelength, it is advantageous to approximate the refractive indices of the different layers in their wavelength dependencies by three-term Sellmeier equations with their respective coefficients, which can be obtained, for example, from the data given by Kobayashi et al (see S. Kobayashi et al: Refractive-index dispersion of doped fused silica, Proc. 1OOC 1977, Tokyo, 309–312). In the table presented below the outermost cladding layer 18 is taken to be pure fused silica, with respect to which the indices of core 12 and threshold cladding layer 16 are assumed to be raised by adding germanium and the inner cladding layer 14 depressed by adding fluorine. Since the regular CVD-fabrication of fiber preforms allows only a limited fluorine concentration and since too much Ge-doping tends to increase fiber losses, both the index depression by fluorine doping and the index increase by Ge were assumed to be limited to 0.4%. To determine the effective group-index $N_{wf}'$ the fundamental mode from it effective index $N_{wf}'$, equation of (1a) was found to be most suitable.

Figure 3:
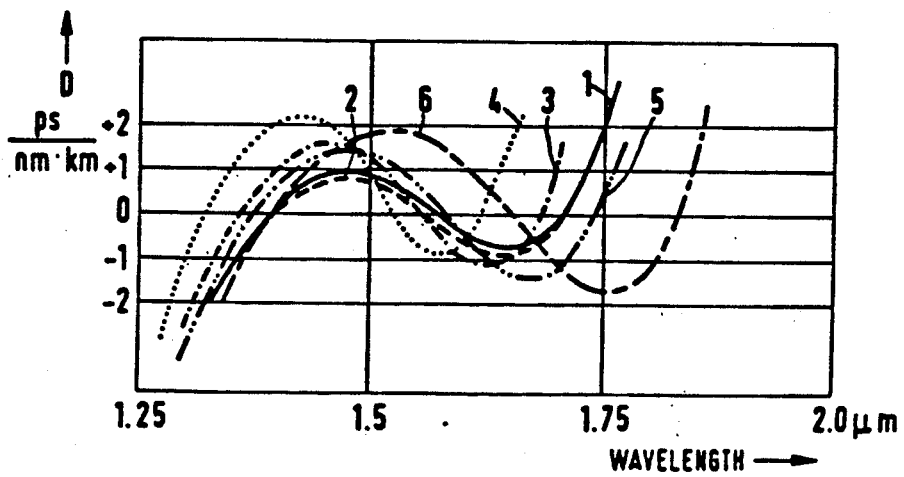
FIG. 3 is a graph of the dispersion coefficients D of WT-fibers 1 to 6 identified in the Table.

A number of WT-fiber designs, which were calculated within these bounds and according to the general specifications for wide range low dispersion, are listed in the Table. Their dispersion coefficients are plotted in FIG. 3 (design numbers 1 through 6) and FIG. 4 (design number 7). The WT-fiber of designs 1 and 2 differs only by 0.2 μm in the outer diameter of their threshold cladding layers 16. They have less than 1 ps/(nm km) dispersion between $\lambda=1.36$ μm and 1.73 μm. It has been difficult to find a WT-fiber design with similarly low dispersion over the same relative spectral range at shorter wavelength. The WT-fiber of design 3, with only 0.2% core index difference, achieves less than 1.6 ps/(nm km) dispersion in between $\lambda=1.32$ μm and 1.7 μm. Dispersion below 2.2 ps/(nm km) between 1.28 μm and 1.65 μm is achieved with the WT-fiber of design 4 by lowering the core index difference even further to 0.15%. However, to extend such a low dispersion characteristic to even shorter wavelengths does not seem possible with a WT-fiber at least not when the index depression by fluorine doping is limited to 0.4%. The minimum of material dispersion is apparently also the lower limit for a wide band of low fundamental-mode dispersion. On the other hand, though, the WT-fiber may be designed to have an even wider spectral range of low dispersion at longer wavelengths. As an example, the WT-fiber of design 6 has less than 1.8 ps/(nm km) dispersion from $\lambda=1.35$ μm to 1.8 μm. Similarly, low overall dispersion over the same spectral ranges has been obtained in quadruple-clad fibers (see L. G. Cohen and W. L. Mammel, mentioned above, and V. A. Bhagavatula et al: Segmented-core single-mode fibers with low loss and low dispersion, Electron. Lett. 19 (1983) 317–318), but a dispersion characteristic with three zeroes has not been reported in these references. Calculations show that such higher order dispersion characteristics also exist for quadruple-clad fibers although they are not significantly better than for the simpler WT-fiber.

Figure 4:
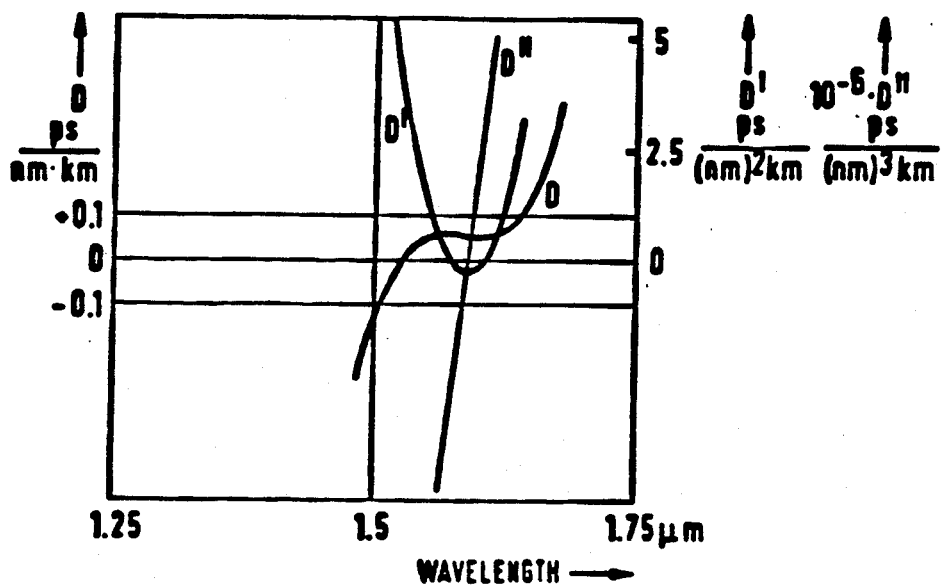
FIG. 4 is a graph of the dispersion coefficient D and the first and second derivatives D' and D" thereof with respect to wavelength of the WT-fiber 7 in the Table.

The WT-fiber 10, with its three zeroes of the dispersion coefficient D for the fundamental mode, can also be designed to have a dispersion minimum of higher order if the three zeroes are made to coincide at one wavelength. For the WT-fiber of design 7 in the Table, the loss minimum near $\lambda=1.55$ μm has been chosen as the wavelength for this higher order dispersion minimum. As FIG. 4 shows, not only does the dispersion coefficient D stay smaller than 0.05 ps/(nm km) in the vicinity of this loss minimum, but also the first and second derivatives of D with respect to wavelength are nearly zero there. Any pulse broadening at this wavelength would be caused by the slope of $d^2D/d\lambda^2$ and would be proportional to the fourth power of the spectral width of the signal and therefore extremely small. Alternatively, since D remains below 0.06 ps/(nm km) from $\lambda=1.52$ μm to 1.64 μm, the signal dispersion in such a fiber would be quite insensitive to detuning of the source wavelength.

TABLE

| | Wide-Band WT-Fibers with Low Dispersion | | | | | | | | |
|---|---|---|---|---|---|---|---|---|---|
| | Core | | Inner Cladding | | Threshold Cladding | | max. Dispersion ps nm km | Wavelength min. μm | Range max. μm |
| Design No. | diam. μm | index diff. % | diam. μm | index diff. % | diam. μm | index diff. % | | | |
| 1 | 8.2 | 0.3 | 13 | −0.4 | 22.2 | 0.075 | 1 | 1.36 | 1.73 |
| 2 | 8.2 | 0.3 | 13 | −0.4 | 22.4 | 0.075 | 1 | 1.36 | 1.73 |
| 3 | 10 | 0.2 | 15.2 | −0.4 | 22 | 0.1 | 1.6 | 1.32 | 1.70 |
| 4 | 11.8 | 0.15 | 17.2 | −0.4 | 27.5 | 0.07 | 2.2 | 1.28 | 1.65 |
| 5 | 8.2 | 0.3 | 13 | −0.4 | 23 | 0.065 | 1.4 | 1.34 | 1.76 |
| 6 | 8 | 0.3 | 12.2 | −0.4 | 18 | 0.05 | 1.8 | 1.35 | 1.8 |
| | | | | | | | 0.06 | 1.52 | 1.64 |
| 7 | 7 | 0.4 | 11.2 | −0.4 | 18.2 | 0.07 | 1 | 1.44 | 1.74 |

In the Table, the "index diff. %" columns indicate the percentages by which the index of refraction differs from the index of refraction of an outer layer of pure fused silica; a positive percentage indicates that the index of refraction is greater than that of pure fused silica while a negative percentage indicates that the index of refraction is less. The figures for diameter refer to outer diameters, and it will be apparent that the inner diameter of a threshold cladding layer, for example, is the same as the outer diameter of the corresponding inner cladding layer. In the Table it should be observed that the ratio of the outer diameter to the inner diameter of the threshold cladding layer in a fiber ranges from a low of about 1.4 (the fiber of design 3) to a high of about 1.8 (the fiber of design 5). The percentage by which the index of refraction of the threshold cladding layer is greater than that of the outer cladding layer of a fiber ranges from 0.05% (the fiber of design 6) to 0.1% (the fiber of design 3). However embodiments can have a higher index refraction percentage difference and in preferred embodiments this can reach 0.15%. Furthermore in the Table the ratio of the inner diameter of the threshold cladding to the core diameter ranges from 1.4 to 1.6, however in preferred embodiments it can reach 1.8. Also in the Table the index of refraction of the inner cladding is 0.4% lower than the index of refraction of the outer cladding and the core index from 0.15% to 0.4% greater than the outer cladding index . But in preferred embodiments these index differences can range for the inner cladding from 0.2% to 0.8% below and for the core from 0.15% to 0.8% above the outer cladding index.

The outer diameter of the outer cladding should not be smaller than 50 μm and does not need to be larger than 200 μm.

A fiber according to the present invention can be easily fabricated for there exists only one relative minimum of refractive index.

It will be understood that the above description of the present invention is susceptible to various modifications, changes and adaptations, and the same are intended to be comprehended within the meaning and range of equivalents of the appended claims.

What is claimed is:

1. A fiber for transmitting an optical signal, consisting essentially of: a core; and cladding means around said core for producing a wavelength dispersion coefficient having a relative maximum and a relative minimum when optical signals are transmitted through said fiber, said cladding means including an inner cladding layer disposed around the core and having an index of refraction that is less than the index of refraction of the core, a threshold cladding layer disposed around the inner cladding layer and having an index of refraction that is greated than the index of refraction of the inner cladding layer, and an outer cladding layer disposed around the threshold cladding layer and having an index of refraction that is less than the index of refraction of the threshold cladding layer, wherein the ratio of the inner diameter of the threshold cladding layer to the core diameter ranges from about 1.4 to about 1.8.

2. A fiber of claim 1, wherein said relative maximum and relative minimum have substantially the same absolute values.

3. The fiber of claim 1, wherein the ratio of the outer diameter of the threshold cladding layer to the inner diameter thereof ranges from about 1.4 to about 1.8, and wherein the index of refraction of the threshold cladding layer ranges from about 0.05% to about 0.15% greater than the index of refraction of the outer cladding layer.

4. The fiber of claim 3, wherein the index of refraction of the inner cladding layer ranges from about 0.2% to about 0.8% lower than the index of refraction of the outer cladding layer, and wherein the index of refraction of the core ranges from about 0.15% to about 0.8% greater than the index of refraction of the outer cladding layer.

5. A single-mode W-fiber consisting essentially of:
a cylindrical core;
a cylindrical inner cladding layer surrounding the core;
an outer cladding layer surrounding the inner layer; and
means, cooperating with the core and the inner and outer cladding layers, for imparting to the fiber a wavelength dispersion coefficient that is zero at three different wavelengths, said means including a cylindrical threshold cladding layer disposed between the inner and outer cladding layers, the index of refraction of the threshold cladding layer being greater than the index of refraction of the outer cladding layer,
wherein the ratio of the outer diameter of the threshold cladding layer to the inner diameter thereof as well as the ratio of the inner diameter of the threshold cladding layer to the core diameter range from about 1.4 to about 1.8, and wherein the index of refraction of the threshold cladding layer ranges from about 0.05% to about 0.15% greater than the index of refraction of the outer cladding layer, while the index of refraction of the inner cladding ranges from 0.2% to 0.8% lower than the index of refraction of the outer cladding layer and the index of refraction of the core ranges from 0.15% to 0.8% greater than the index of refraction of the outer cladding layer.

6. The fiber of claim 5, wherein the index of refraction of the core is greater than the index of refraction of the threshold cladding layer and the index of refraction of the outer cladding layer is greater than the index of refraction of the inner cladding layer.

7. The fiber of claim 5, wherein the wavelength dispersion coefficient has a relative maximum and a relative minimum, the relative maximum and relative minimum having substantially the same absolute value.

* * * * *